(12) United States Patent
B T et al.

(10) Patent No.: US 9,619,393 B1
(45) Date of Patent: Apr. 11, 2017

(54) OPTIMIZED USE OF HARDWARE MICRO PARTITION PREFETCH BASED ON SOFTWARE THREAD USAGE

(71) Applicant: INTERNATIONAL BUSINESS MACHINES CORPORATION, Armonk, NY (US)

(72) Inventors: Hemalatha B T, Bangalore (IN); Peter J. Heyrman, Rochester, MN (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/935,490

(22) Filed: Nov. 9, 2015

(51) Int. Cl.
G06F 12/00 (2006.01)
G06F 12/0873 (2016.01)
G06F 9/50 (2006.01)
G06F 9/455 (2006.01)

(52) U.S. Cl.
CPC ...... *G06F 12/0873* (2013.01); *G06F 9/45558* (2013.01); *G06F 9/5077* (2013.01); *G06F 2009/45595* (2013.01); *G06F 2212/1041* (2013.01); *G06F 2212/152* (2013.01); *G06F 2212/281* (2013.01); *G06F 2212/608* (2013.01)

(58) Field of Classification Search
CPC ............. G06F 12/0873; G06F 9/45558; G06F 9/5077; G06F 2009/45595; G06F 2212/1041; G06F 2212/152; G06F 2212/281; G06F 2212/608
See application file for complete search history.

(56) References Cited

U.S. PATENT DOCUMENTS

| 7,272,664 B2 | 9/2007 | Arimilli et al. |
| 7,797,564 B2 | 9/2010 | Hack |
| 8,352,950 B2 | 1/2013 | Dillenberger et al. |
| 9,086,957 B2 | 7/2015 | Cordero et al. |
| 2014/0223109 A1 | 8/2014 | Heyrman et al. |

OTHER PUBLICATIONS

List of IBM Patents or Patent Applications Treated As Related, October 5, 2016, pp. 1-2.
P. Mell et al., "The NIST Definition of Cloud Computing", National Institute of Standards and Technology, Information Technology Laboratory, Sep. 2011, pp. 1-7.

(Continued)

*Primary Examiner* — Shawn X Gu
(74) *Attorney, Agent, or Firm* — Law Office of Jim Boice

(57) ABSTRACT

A system and/or computer program product selectively adjusts a resources addresses cache of addresses of resources used by virtual processors. A first dispatch from a hypervisor dispatches a first virtual processor, and then tracks processes executed by the first virtual processor. The hypervisor caches cache addresses of resources used by the processes after the first dispatch in a resources addresses cache. The hypervisor undispatches the first virtual processor, and then redispatches the first virtual processor as a second virtual processor by issuing a second dispatch. Processes executed by the second virtual processor are compared to processes executed during by the first virtual processor, thus leading to an identification of a level of process utilization consistency. The hypervisor then adjusts the resources addresses cache by selectively clearing resource addresses based on the level of process utilization consistency.

10 Claims, 9 Drawing Sheets

(56) References Cited

OTHER PUBLICATIONS

Xue et al., "Loop Scheduling with Complete Memory Latency Hiding on Multi-Core Architecture." Parallel and Distributed Systems, 2006. ICPADS 2006. 12th International Conference on. vol. 1. IEEE, 2006.
Tcheun et al., "An Adaptive Sequential Prefetching Shceme in Shared-Memory Multiprocessors." Parallel Processing, 1997., Prcoeedings of the 1997 International Conference on. IEEE, 1997.
Sha, Lui, et al. "Single Core Equivalent Virtual Machines for Hard Real-Time Computing on Multicore Processors." SCE_MAGAZINE_V15 (2014).
Jackson et al. "IBM System Z10 Performance Improvements With Software and Hardware Synergy." IBM Journal of Research and Development 53.1 (2009): 16-1.
Lu et al., "Virtual Machine Memory Access Tracing With Hypervisor Exclusive Cache." USENIX Annual Technical Conference. 2007.

OPTIMIZED USE OF HARDWARE MICRO PARTITION PREFETCH BASED ON SOFTWARE THREAD USAGE

BACKGROUND

The present disclosure relates to the field of computing devices, and specifically to computers that support virtual processors. Still more specifically, the present disclosure relates to the field of perfecting threads in virtual processors.

A virtual processor is a software emulation of a hardware processor. That is, software running on a hardware platform provides an interface to the hardware platform. This interface exchanges data, software, etc. from a user device in a manner that gives the user device the impression that it is actually interfacing with a hardware processor. Virtual processors may be implemented in specialized hardware, software, or a combination of both.

The hardware platform on which the virtual processor is created is a computer known as a host machine. Within or accessible to the host machine is a hypervisor, which is hardware and/or software that creates the virtual processor. The hypervisor is supported by an operating system on the host machine.

SUMMARY

A system and/or computer program product adjusts contents of a resources addresses cache for a first virtual processor for use by a subsequently-dispatched second virtual processor. One or more processors dispatch a first virtual processor by a first dispatch from a hypervisor. The processor(s) track processes executed by the first virtual processor during a first predetermined time period after the first dispatch. The processor(s) cache addresses of resources used by the processes executed by the first virtual processor during the first predetermined time period in a resources addresses cache. The processor(s) undispatch the first virtual processor, and then dispatch a second virtual processor by a second dispatch from the hypervisor. The processor(s) track processes executed by the second virtual processor during a second predetermined time period after the second dispatch, and then compare processes executed by the first virtual processor during the first predetermined time period to processes executed by the second virtual processor during the second predetermined time period, leading to an identification of a level of process utilization consistency based on this comparison. The processor(s) then adjust the resources addresses cache by selectively clearing resources addresses from the resources addresses cache based on the level of process utilization consistency.

DETAILED DESCRIPTION

Figure 1:
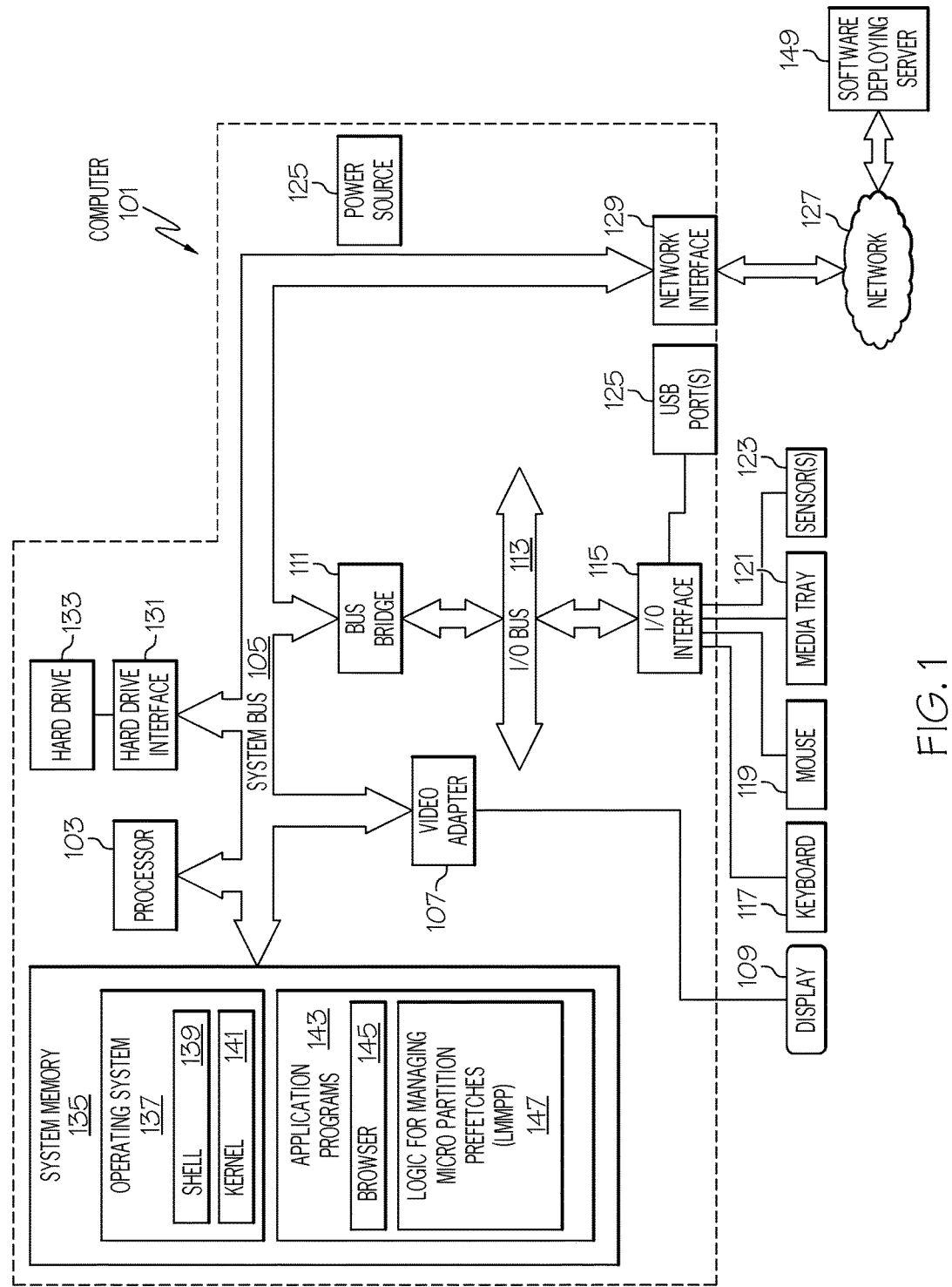
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and/or hardware sensor(s) 123.

Examples of hardware sensor(s) 123 include, but are not limited to: sensors that detect clock speed and CPU usage by processor 103: sensors that detect bus usage (i.e., bandwidth) of system bus 105 and/or I/O bus 113; environmental sensors such as atmospheric pressure sensors, thermometers, sound level sensors, etc.; accelerometers that detect movement, either gradual or sudden, of computer 101; etc. While sensors(s) 123 are depicted as being connected to I/O interface 115, in one or more embodiments sensor(s) 123 are coupled directly to processor 103, system bus 105, and/or I/O bus 113 (e.g., to directly measure operations and performance of components within computer 101).

While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129 to a network 127. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc. Network 127 may connect computer 101 to a software deploying server 149.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Managing Micro Partition Prefetches (LMMPP) 147. LMMPP 147 includes code for implementing the processes described below, including those described in FIGS. 2-7. In one or more embodiments, software deploying server 149 deploys LMMPP 147 to computer 101 on an as-needed basis.

Also within computer 101 is a power source 125. When plugged into a nearly unlimited power supply (e.g., a power grid from a power company), the power source 125 is the system of outlets, wires, transformers that support the power grid. However, when part of a mobile computing device, power source 125 is a battery.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
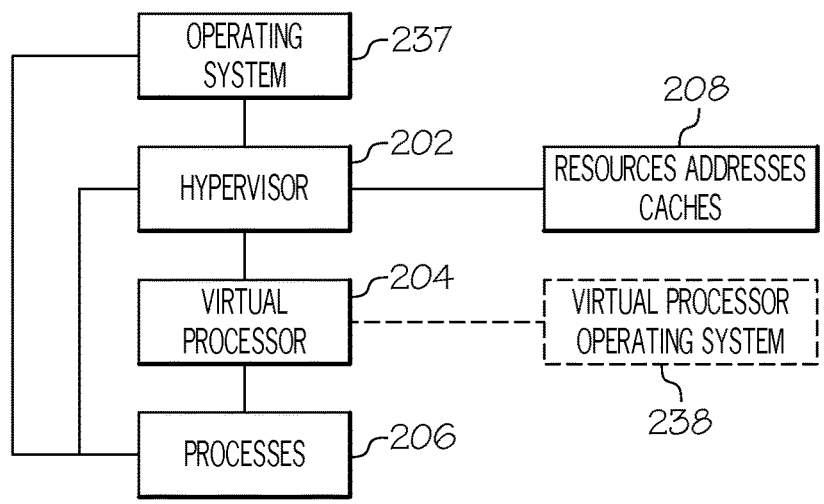
FIG. 2 illustrates a relationship between an operating system, a hypervisor, a virtual processor, processes, and a resources addresses cache in accordance with one or more embodiments of the present invention.

FIG. 2 illustrates a relationship between an operating system, a hypervisor, a virtual processor, processes, and a resources addresses cache in accordance with one or more embodiments of the present invention.

As shown in FIG. 2, an operating system 237 (analogous to operating system 137 shown in FIG. 1) controls a hypervisor 202, which deploys and manages a virtual processor 204. The virtual processor 204 is software, firmware, dedicated hardware, and/or a combination thereof that emulates a real physical processor. The deployment of the virtual processor 204 is known as "dispatching" the virtual processor 204. When the virtual processor 204 is decommissioned (i.e., disabled, disassembled, removed from current execution, etc.), this decommissioning is referred to as the hypervisor 202 "undispatching" the virtual processor 204. The hypervisor 202 is a unit of software, firmware, and/or a dedicated hardware device for managing virtual processor 204.

As shown in FIG. 2, the virtual processor 204 executes processes 206, which are units of software programs. In one embodiment, this software execution is under the control and management of the operating system 237. In another embodiment, this software execution is under the control and management of a virtual processor operating system 238, which is an operating system that is dedicated to be used by virtual processor 204.

As shown in FIG. 2, the hypervisor 202 directs processor hardware to maintain resources addresses caches 208, which store the addresses (physical, logical, etc.) of resources (software or hardware) that are used by the virtual processor 204 while executing the processes 206. Additional detail of this feature is presented below in FIG. 3 and FIG. 5.

Figure 3:
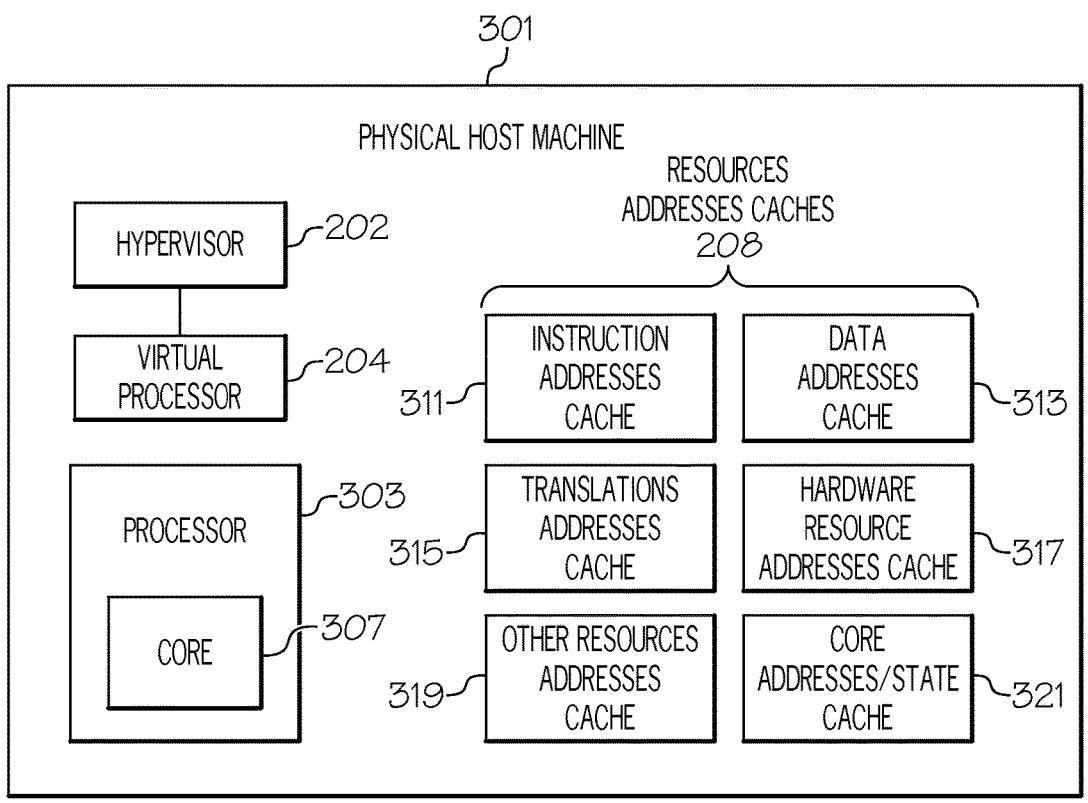
FIG. 3 depicts detail of an exemplary physical host machine that hosts the virtual processor depicted in FIG. 2.

With reference now to FIG. 3, detail of an exemplary physical host machine 301 that hosts the hypervisor 202 and virtual processor 204 depicted in FIG. 2 is presented.

As shown in FIG. 3, various versions of the resources addresses caches 208 introduced in FIG. 2 are presented.

For example, an instruction addresses cache 311 stores the addresses of instructions used by the virtual processor 204 when executing the processes 206 shown in FIG. 2 during a particular dispatch of the virtual processor 204. Such addresses may be physical, logical, relational, etc.

A data addresses cache 313 stores the addresses of data used by the virtual processor 204 when executing the processes 206 shown in FIG. 2 during a particular dispatch of the virtual processor 204. Such addresses may be physical, logical, relational, etc.

A translations addresses cache 315 stores the addresses of translations used by the virtual processor 204 when executing the processes 206 shown in FIG. 2 during a particular dispatch of the virtual processor 204. Such addresses may be physical, logical, relational, etc. Translations used by the virtual processor 204 are translations of addresses used by the processes 206. That is, the translator converts a set of effective addresses into virtual and physical addresses through hardware translation mechanisms.

A hardware resources cache 317 stores the content and/or addresses of hardware resources, including memory resources, used by the virtual processor 204 when executing the processes 206 shown in FIG. 2 during a particular dispatch of the virtual processor 204. In addition to normal caching or data, etc., additional states are captured over time to represent the addresses of the most recently used cache lines, Such addresses may refer to Internet Protocol (IP) data, media access control (MAC) data, program instructions, etc. that identify the physical location of hardware resources (e.g., sensor(s) 123, processor 103, hard drive 133, etc. shown in FIG. 1) used by the virtual processor 204 when executing the processes 206.

Other resources addresses cache 319 stores the addresses and/or data of/from other resources used by the virtual processor 204 when executing the processes 206 shown in FIG. 2. Such resources include, but are not limited to, universal resource locator (URL) addresses of webpages, uniform resource identifier (URI) that identify resources on a network, etc.

A core addresses/state cache 321 identifies components used within a core 307 of processor 303 that is used by the virtual processor 204 when executing the processes 206 shown in FIG. 2, and/or the soft states and/or hard states of core 307 when it is undispatched. That is, within core 307 are particular components that are used by the processes 206. The identity and/or location of such components (e.g., L-1 data cache 420 shown in FIG. 4) are stored within the core addresses/state cache 321. In one or more embodiments of the present invention, soft/hard states (described below with reference to FIG. 4) of the core 307 may also be stored in the core addresses/state cache 321.

Figure 4:
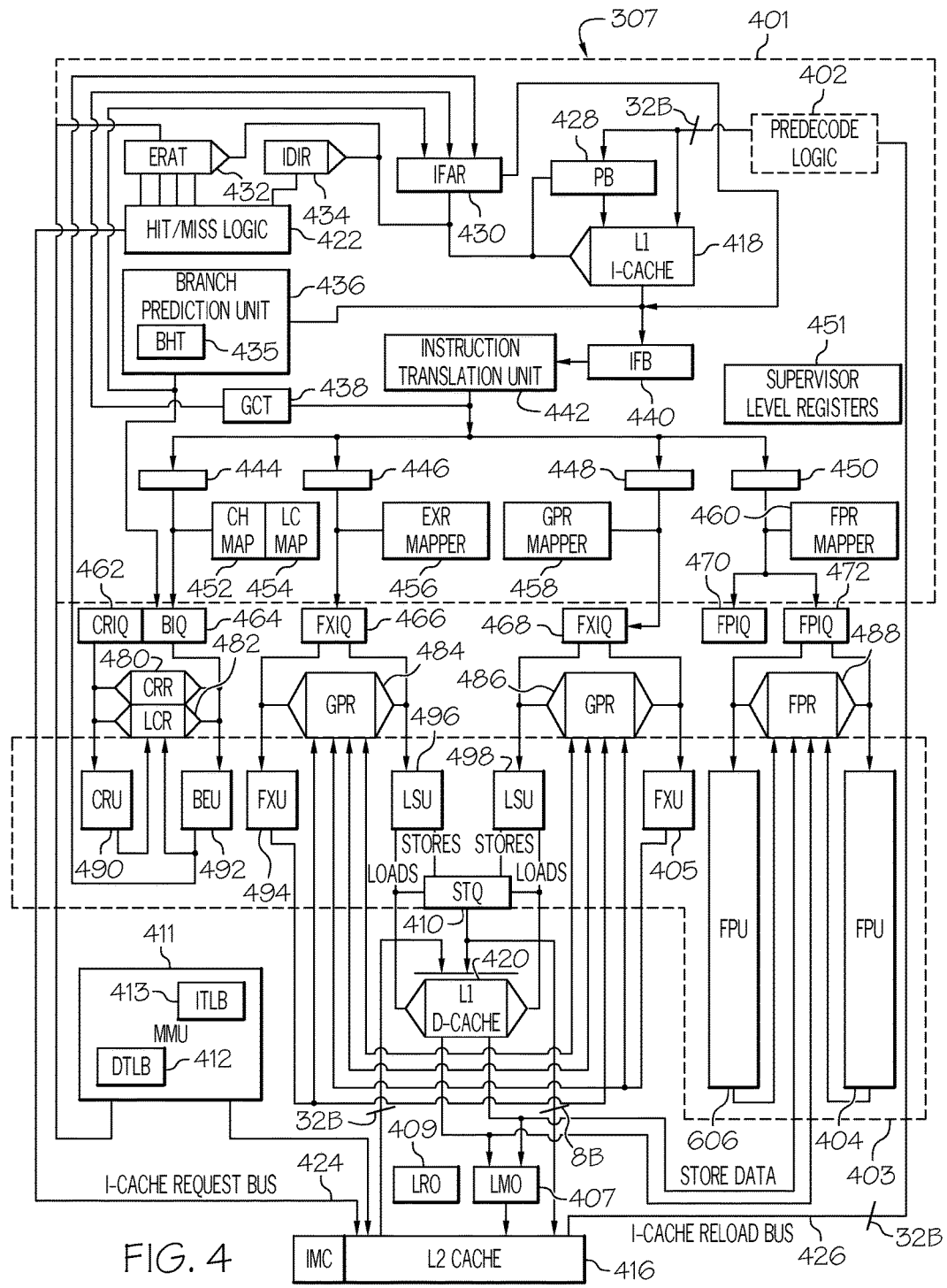
FIG. 4 illustrates detail of a core within a processor used by the physical host machine depicted in FIG. 3.

With reference now to FIG. 4, additional exemplary detail of core 307 depicted in FIG. 3 is presented. Core 307 includes an on-chip multi-level cache hierarchy including a unified level two (L2) cache 416 and bifurcated level one (L1) instruction (I) and data (D) caches 418 and 420, respectively. As is well-known to those skilled in the art, caches 416, 418 and 420 provide low latency access to cache lines corresponding to memory locations in system memories (e.g., system memory 135 shown in FIG. 1).

Instructions are fetched for processing from L1 I-cache 418 in response to the effective address (EA) residing in instruction fetch address register (IFAR) 430. During each cycle, a new instruction fetch address may be loaded into IFAR 430 from one of three sources: branch prediction unit (BPU) 436, which provides speculative target path and sequential addresses resulting from the prediction of conditional branch instructions, global completion table (GCT) 438, which provides flush and interrupt addresses, and branch execution unit (BEU) 492, which provides non-speculative addresses resulting from the resolution of predicted conditional branch instructions. Associated with BPU 436 is a branch history table (BHT) 435, in which are recorded the resolutions of conditional branch instructions to aid in the prediction of future branch instructions.

An effective address (EA), such as the instruction fetch address within IFAR 430, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within core 307, effective-to-real address translation is performed by memory management units (MMUs) and associated address translation facilities. Preferably, a separate MMU is provided for instruction accesses and data accesses. In FIG. 4, a single MMU 411 is illustrated, for purposes of clarity, showing connections only to Instruction Store Unit (ISU) 401. However, it is understood by those skilled in the art that MMU 411 also preferably includes connections (not shown) to load/store units (LSUs) 496 and 498 and other components necessary for managing memory accesses. MMU 411 includes Data Translation Lookaside Buffer (DTLB) 412 and Instruction Translation Lookaside Buffer (ITLB) 413. Each TLB contains recently referenced page table entries, which are accessed to translate EAs to RAs for data (DTLB 412) or instructions (ITLB 413). Recently referenced EA-to-RA translations from ITLB 413 are cached in EOP effective-to-real address table (ERAT) 432.

If hit/miss logic 422 determines, after translation of the EA contained in IFAR 430 by ERAT 432 and lookup of the real address (RA) in I-cache directory 434, that the cache line of instructions corresponding to the EA in IFAR 430 does not reside in L1 I-cache 418, then hit/miss logic 422 provides the RA to L2 cache 416 as a request address via I-cache request bus 424. Such request addresses may also be generated by prefetch logic within L2 cache 416 based upon recent access patterns. In response to a request address, L2 cache 416 outputs a cache line of instructions, which are loaded into prefetch buffer (PB) 428 and L1 I-cache 418 via I-cache reload bus 426, possibly after passing through optional predecode logic 402.

Once the cache line specified by the EA in IFAR 430 resides in L1 I-cache 418, L1 I-cache 418 outputs the cache line to both branch prediction unit (BPU) 436 and to instruction fetch buffer (IFB) 440. BPU 436 scans the cache line of instructions for branch instructions and predicts the outcome of conditional branch instructions, if any. Following a branch prediction, BPU 436 furnishes a speculative instruction fetch address to IFAR 430, as discussed above, and passes the prediction to branch instruction queue 464 so that the accuracy of the prediction can be determined when the conditional branch instruction is subsequently resolved by branch execution unit 492.

IFB 440 temporarily buffers the cache line of instructions received from L1 I-cache 418 until the cache line of instructions can be translated by instruction translation unit (ITU) 442. In the illustrated embodiment of core 307, ITU 442 translates instructions from user instruction set architecture (UISA) instructions into a possibly different number of internal ISA (IISA) instructions that are directly executable by the execution units of core 307. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 438 to an instruction group, the members of which are permitted to be dispatched and executed out-of-order with respect to one another. Global completion table 438 tracks each instruction group for which execution has yet to be completed by at least one associated EA, which is preferably the EA of the oldest instruction in the instruction group.

Following UISA-to-IISA instruction translation, instructions are dispatched to one of latches 444, 446, 448 and 450, possibly out-of-order, based upon instruction type. That is, branch instructions and other condition register (CR) modifying instructions are dispatched to latch 444, fixed-point and load-store instructions are dispatched to either of latches 446 and 448, and floating-point instructions are dispatched to latch 450. Each instruction requiring a rename register for temporarily storing execution results is then assigned one or more rename registers by the appropriate one of CR mapper 452, link and count (LC) register mapper 454, exception register (EXR) mapper 456, general-purpose register (GPR) mapper 458, and floating-point register (FPR) mapper 460.

The dispatched instructions are then temporarily placed in an appropriate one of CR issue queue (CRIQ) 462, branch issue queue (BIQ) 464, fixed-point issue queues (FXIQs) 466 and 468, and floating-point issue queues (FPIQs) 470 and 472. From issue queues 462, 464, 466, 468, 470 and 472, instructions can be issued opportunistically to the execution units of processor 103 (shown in FIG. 1) for execution as long as data dependencies and antidependencies are observed. The instructions, however, are maintained in issue queues 462-472 until execution of the instructions is complete and the result data, if any, are written back, in case any of the instructions need to be reissued.

As illustrated, the execution units of core 307 include an execution subcomponent 403, which includes a CR unit (CRU) 490 for executing CR-modifying instructions, a branch execution unit (BEU) 492 for executing branch instructions, two fixed-point units (FXUs) 494 and 405 for executing fixed-point instructions, two load-store units (LSUs) 496 and 498 for executing load and store instructions, and two floating-point units (FPUs) 406 and 404 for executing floating-point instructions. Each of execution units 490-404 is preferably implemented as an execution pipeline having a number of pipeline stages.

During execution within one of execution units 490-404, an instruction receives operands, if any, from one or more architected and/or rename registers within a register file coupled to the execution unit. When executing CR-modifying or CR-dependent instructions, CRU 490 and BEU 492 access the CR register file 480, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 482 contains a count register (CTR), a link register (LR) and rename registers of each, by which BEU 492 may also resolve conditional branches to obtain a path address. General-purpose register files (GPRs) 484 and 486, which are synchronized, duplicate register files, and store fixed-point and integer values accessed and produced by FXUs 494 and 405 and LSUs 496 and 498. Note that floating-point register file (FPR) 488, which like GPRs 484 and 486 may also be implemented as duplicate sets of synchronized registers, contains floating-point values that result from the execution of floating-point instructions by FPUs 406 and 404 and floating-point load instructions by LSUs 496 and 498.

After an execution unit finishes execution of an instruction, the execution unit notifies GCT 438, which schedules completion of instructions in program order. To complete an instruction executed by one of CRU 490, FXUs 494 and 405 or FPUs 406 and 404, GCT 438 signals the execution unit, which writes back the result data, if any, from the assigned rename register(s) to one or more architected registers within the appropriate register file. The instruction is then removed from the issue queue and once all instructions within its instruction group have been completed, it is removed from GCT 438. Other types of instructions, however, are completed differently.

When BEU 492 resolves a conditional branch instruction and determines the path address of the execution path that should be taken, the path address is compared against the speculative path address predicted by BPU 436. If the path addresses match, no further processing is required. If, however, the calculated path address does not match the predicted path address, BEU 492 supplies the correct path address to IFAR 430. In either event, the branch instruction can then be removed from BIQ 464, and when all other instructions within the same instruction group have completed executing, from GCT 438.

Following execution of a load instruction, the effective address computed by executing the load instruction is translated to a real address by a data ERAT (not illustrated) and then provided to L1 D-cache 420 as a request address. At this point, the load instruction is removed from FXIQ 466 or 468 and placed in load reorder queue (LRQ) 409 until the indicated load is performed. If the request address misses in L1 D-cache 420, the request address is placed in load miss queue (LMQ) 407, from which the requested data is retrieved from L2 cache 416, and failing that, from another core 307 or from system memory. LRQ 409 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 410 into which effective addresses for stores are loaded following execution of the store instructions. From STQ 410, data can be stored into either or both of L1 D-cache 420 and L2 cache 416.

Note that the state of a processor includes stored data, instructions and hardware states at a particular time, and are herein defined as either being "hard" or "soft." The "hard" state is defined as the information within a processor that is architecturally required for a processor to execute a process from its present point in the process. The "soft" state, by contrast, is defined as information within a processor that would improve efficiency of execution of a process, but is not required to achieve an architecturally correct result. In core 307 of FIG. 4, the hard state includes the contents of user-level registers, such as CRR 480, LCR 482, GPRs 484 and 486, FPR 488, as well as supervisor level registers 451. The soft state of core 307 includes both "performance-critical" information, such as the contents of L1 I-cache 418, L1 D-cache 420, address translation information such as DTLB 412 and ITLB 413, and less critical information, such as BHT 435 and all or part of the content of L2 cache 416. Thus, the content of such registers are fixed values that describe a real-time current architecture state register of the processor core 307.

Note that as used to describe core 307 in FIG. 4, L1 denotes lowest level of cache, which is first checked to locate an operand (in the case of a data (D) cache) or data (in the case of a data (D) cache). If the requisite operand/data is not found within the L1 cache (i.e., a "cache miss"), then the next highest level cache memory (L2 cache) is searched. If there is an L2 cache miss, then the next highest L3 cache (if the system has an L3 level cache) is searched. If there is an L2/L3 cache miss, then system memory is searched for the requisite operand/data. If system memory does not have the needed operand/data (e.g., a page fault), then virtual memory, persistent memory (e.g., a hard drive), and/or a memory cloud (e.g., a network of storage devices) are searched for the needed operand or data.

In one embodiment, if virtual processor 204 is undispatched, then a core dump will occur. A core dump includes a recorded state of memory being used by an application (e.g., one or more of the processes 206) at the time of the undispatch. The core dump includes contents of a program counter, stack pointer, OS flags, etc. In one embodiment, the core dump specifically includes contents of the L1 instruction cache 418, the L1 data cache 420, the L2 cache 416, the CRR 480, LCR 482, GPR 484, and/or FPR 488 depicted and described in FIG. 4. Thus, the content of the core dump contains the "hard" state and/or the "soft" state of the core, as described/defined above.

Figure 5:
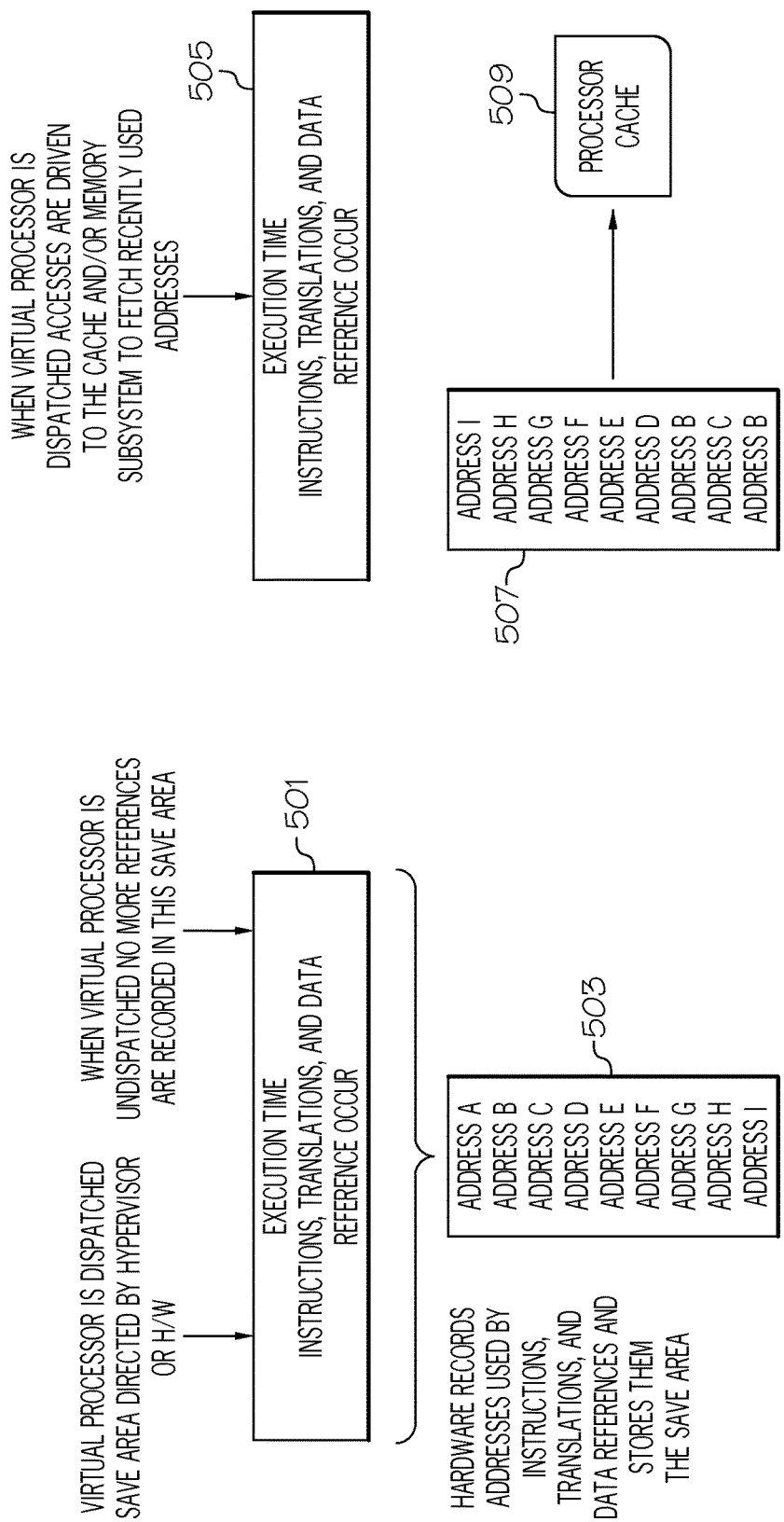
FIG. 5 depicts a hypervisor caching addresses of resources used by a processor.

Before discussing FIG. 5, an overview of the concept of a micro partition prefetch is presented. A micro partition prefetch is a feature that is designed to save the addresses of resources recently used by a virtual processor, thus enabling access to the contents of the resources by placing their addresses in a special resources addresses cache in the virtual processor when the virtual processor is redispatched.

For example, as shown in FIG. 5 a hypervisor dispatches a virtual processor. During execution/dispatch/deployment time (of the virtual processor), instructions, translations, data references, etc. occur (see block 501). As such resources (instructions, translations, data, etc.) are used by the dispatched virtual processor, their addresses are cached (see block 503) until the virtual processor is undispatched (e.g., disassembled). When the virtual processor is re-dispatched (see block 505), addresses of previously used resources are pulled from block 503 and added to addresses of newly-used resources to create an address list 507, which is stored in a known address range in a processor cache 509 for use by future dispatches of the virtual processor.

However, when all resource addresses are restored at the time of a virtual processor redispatch, then micro partition prefetch frequently makes overall system performance worse than not having it at all. Generally speaking, there are two factors that explain the performance negatives of such unrestricted micro partition prefetch.

First, the previously saved cache state may include items that will not be used in the next dispatch (block 505 and list 507). That is, Address I from list 503 may be in list 507 (and thus processor cache 509), but the resource associated with Address I may never be needed again by the virtual processor. This leads to cache misses, since the unused resource associated with Address I takes up space in the processor cache 509, thus potentially preventing needed addresses from being cached.

Second, unrestricted micro partition prefetch increases memory subsystem traffic, resulting in delays for accesses that can occur on other processors on the same chip.

In order to mitigate this problem, the present invention optimizes usage of micro partition prefetch by a prediction of its benefit, based on a workload profile. If the workload is constantly changing in some way (i.e., different processes are being executed whenever the virtual processor is re-dispatched), the effectiveness of the micro partition prefetch is likely reduced. However, if the virtual processor consistently executes the same processes, then micro partition prefetch is highly effective.

Figure 6:
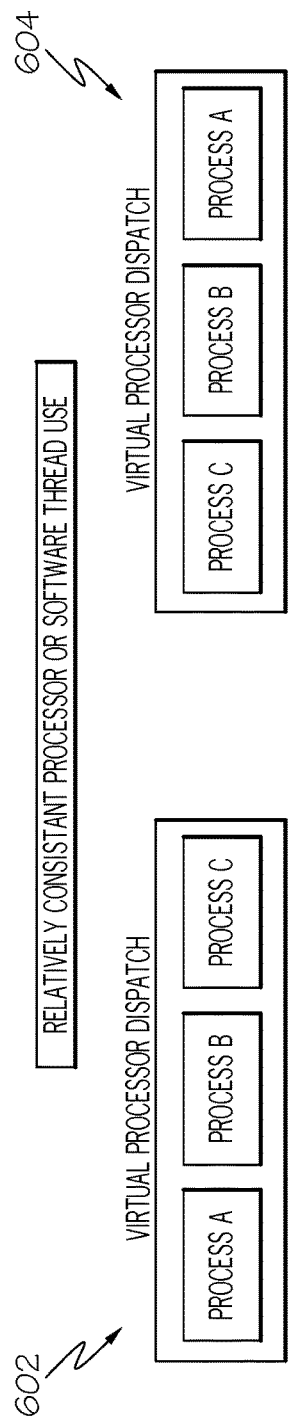
FIG. 6 illustrates a virtual processor consistently executing the same processes.

For example, consider FIG. 6, which depicts a virtual processor consistently executing the same processes. That is, as shown in block 602, the virtual processor executes Process A, Process B, and Process C when initially dispatched. As shown in block 604, the virtual processor also executes Process A, Process B, and Process C when subsequently re-dispatched. Thus, micro partition prefetch in this scenario is highly effective, since there is a strong likelihood that the same software threads, hardware resources, processor, etc. will be utilized by the virtual processor when executing Process A, Process B, and Process C.

Figure 7:
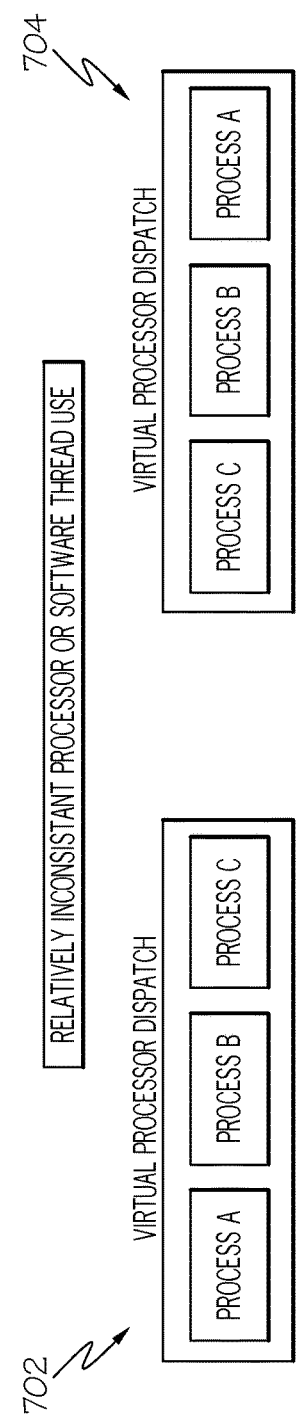
FIG. 7 depicts a virtual processor inconsistently executing the same processes.

However, as shown in FIG. 7, the virtual processor executes Process A, Process B, and Process C when initially dispatched (see block 702), but then executes different processes (Process D, Process E, and Process F) when subsequently re-dispatched (see block 704). Thus, micro partition prefetch in this scenario is likely inefficient, since there is a strong likelihood that the software threads, hardware resources, processor, etc. utilized by the virtual processor when executing Process D, Process E, and Process F will be different from the software threads, hardware resources, processor, etc. utilized by the virtual processor when it executed Process A, Process B, and Process C.

In one or more embodiments of the present invention, the micro partition prefetch mechanism also stores the addresses of the most recently used cache lines (e.g., that hold the addresses of resources used in the processes) in a way that can be saved and later used to initiate prefetching of the addresses upon a micro partition dispatch. This state collection of used resource addresses can thus be easily referred to again later by other virtual processors. Furthermore and as described herein, in one or more embodiments of the present invention the resources addresses cache is a dedicated cache that only stores addresses of resources used by the processes being executed by the virtual processor(s), and are separate and distinct from a traditional instruction cache (I-cache) or data cache (D-cache).

From a high-level view, the present invention can be implemented in various ways, including but not limited to the following embodiments.

In a first embodiment, operating system(s) (e.g., operating system 237 shown in FIG. 2) running on top of a hypervisor (e.g., hypervisor 202 shown in FIG. 2) track their usage of unique threads over time and indicate to the hypervisor (upon the call to undispatch a virtual processor) that the partition's (i.e., virtual processor's) thread usage is stable over time. The operating system keeps a history of thread usage via instrumentation of dispatch or by some manner of time-based profiling. Since voluntary dispatches on idle are triggered by a hypervisor call, in one embodiment a flag is added to the virtual processor. Involuntary dispatches require a different mechanism of communicating between the hypervisor and the operating system, such as a flag in a communications area that is operating system writeable.

In a second embodiment, a mechanism (e.g., hypervisor 202) places a process identifier (and/or a logical process identifier) in special registers in the processor hardware by software. Such identifiers may be used for translation purposes (such as on x86 acceleration of page table management for virtualized environments). In this case, the hypervisor will sample the identifiers in a way to view the general behavior. Optionally, the hardware itself will track the identifiers used for a dispatch in a register or structure that the hypervisor can access. Based on current and previous history, the hypervisor can now predict the stability of the threads used in software.

Thus, as described herein, when the workload appears to have a changing thread dispatch pattern, the micro partition prefetch is skipped on partition dispatch. Alternatively, when the pattern is stable, micro partition prefetch is triggered on partition dispatch.

Figure 8:
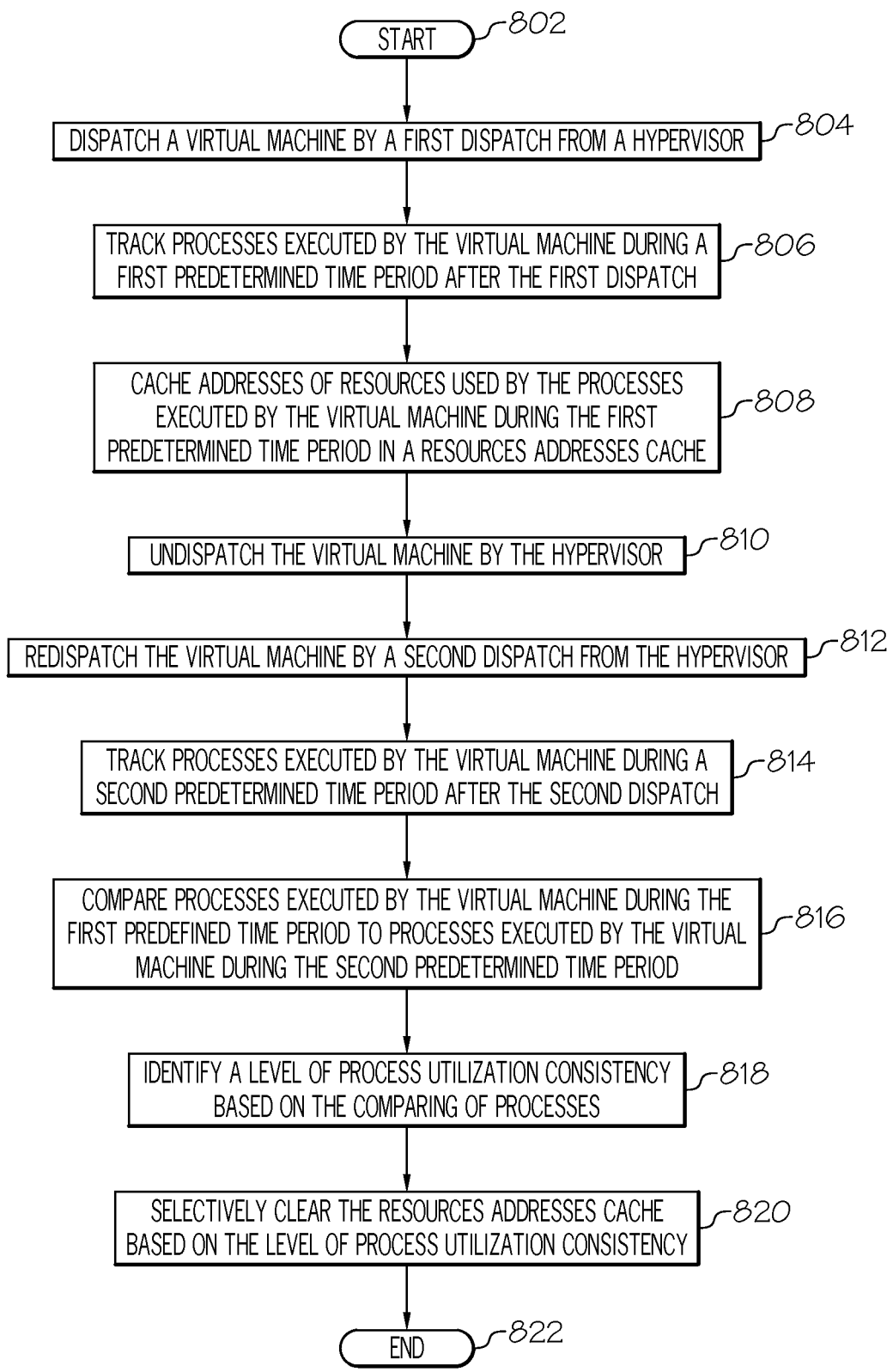
FIG. 8 is a high-level flow chart of one or more steps performed by one or more processors and/or other hardware to selectively clear a resources addresses cache of addresses of resources used by a virtual processor in accordance with or more embodiments of the present invention.

With reference now to FIG. 8, a high-level flow chart of one or more steps performed by one or more processors and/or other hardware to selectively clear a resources addresses cache of addresses of resources used by a virtual processor in accordance with or more embodiments of the present invention is presented.

After initiator block 802, one or more processors cause a hypervisor (e.g., hypervisor 202 shown in FIG. 2) to dispatch a virtual processor (e.g., virtual processor 204) via a first dispatch, as described in block 806.

As described in block 806, the processor(s) (e.g., which support the operating system 237 or the hypervisor 202 shown in FIG. 2) track processes executed by the virtual processor during a first predetermined time period after the first dispatch (e.g., see block 602 in FIG. 6 and/or block 702 in FIG. 7).

As described in block 808, the processor(s) (e.g., which support the operating system 237 or the hypervisor 202 shown in FIG. 2) cache addresses of resources used by the processes executed by the virtual processor during the first predetermined time period in a resources addresses cache (i.e., as long as the virtual processor is operational based on the first dispatch or during some portion of this time period).

As described in block 810, the processor(s) (e.g., which support the operating system 237 or the hypervisor 202 shown in FIG. 2) undispatch the virtual processor. Subsequently and as described in block 812, the processor(s) (e.g., which support the operating system 237 or the hypervisor 202 shown in FIG. 2) then redispatch the virtual processor (i.e., issue a second dispatch message).

As described in block 814, the processor(s) (e.g., which support the operating system 237 or the hypervisor 202 shown in FIG. 2) then track processes executed by the virtual processor during a second predetermined time period after the second dispatch (i.e., as long as the virtual processor is running after the second dispatch, or during some partial period of time therein).

As described in block 816, the processor(s) (e.g., which support the operating system 237 or the hypervisor 202 shown in FIG. 2) then compare processes executed by the virtual processor during the first predetermined time period to processes executed by the virtual processor during the second predetermined time period (e.g., block 602 in FIG. 6 is compared to block 604, and/or block 702 in FIG. 7 is compared to block 704).

As described in block 818, the processor(s) (e.g., which support the operating system 237 or the hypervisor 202 shown in FIG. 2) then identify a level of process utilization consistency based on said comparing of processes. That is, the virtual machine runs/utilizes the same processes during different dispatches/implementation of the virtual machine (see FIG. 6), or the virtual machine runs/utilizes disparate/different processes during different dispatches/implementation of the virtual machine (see FIG. 7)

As described in block 820, the processor(s) (e.g., which support the operating system 237 or the hypervisor 202 shown in FIG. 2) then selectively adjust the resources addresses cache based on the level of process utilization consistency. That is, if the virtual processor runs the same processes during different dispatches of the virtual machine, then some or all of the addresses of resources (hardware and/or software) used by the virtual processor in an initial iteration/dispatch of the virtual machine are retained in the resources addresses caches for use by the virtual machine during subsequent dispatches. However, if the virtual processor runs different/disparate processes during different dispatches of the virtual machine, then some or all of the addresses of resources (hardware and/or software) used by the virtual processor in the initial iteration/dispatch of the virtual machine are removed from the resources addresses caches.

Thus, in one embodiment of the present invention, in response to identifying a level of process utilization consistency that falls below a predefined level (i.e., the processes used by the virtual processor vary widely from dispatch to dispatch), the operating system and/or hypervisor erase some or all entries from the resources addresses cache.

Alternatively, if the level of process utilization consistency exceeds a predefined level (i.e., the processes used by the virtual processor are the same from dispatch to dispatch), then the operating system and/or hypervisor retain some or all of the entries in the resources addresses cache, thus enabling prefetch usage by the virtual processor during the second dispatch or during a subsequent third dispatch.

The flow chart ends at terminator block 822.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
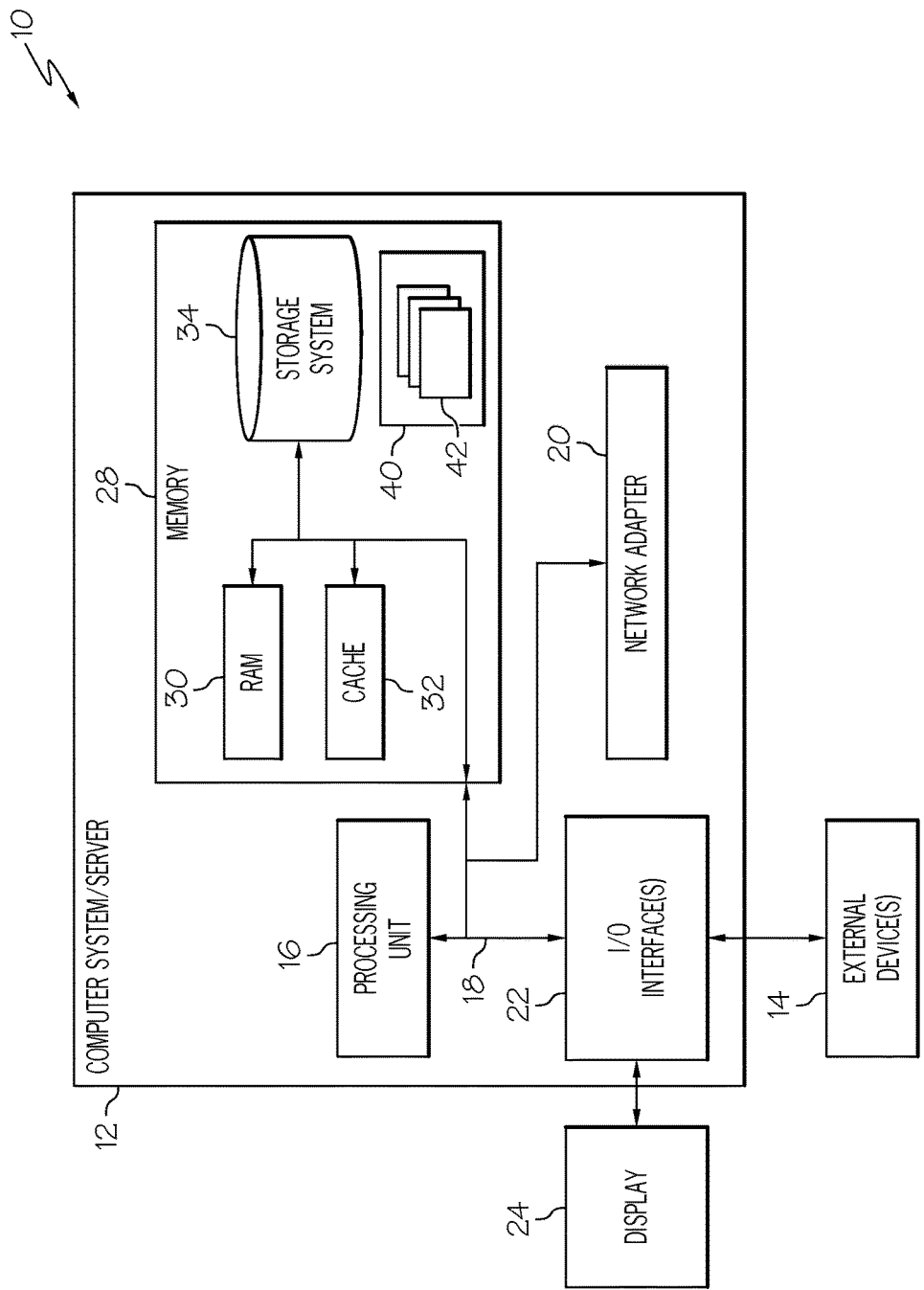
FIG. 9 depicts a cloud computing node according to an embodiment of the present disclosure.

Referring now to FIG. 9, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 10:
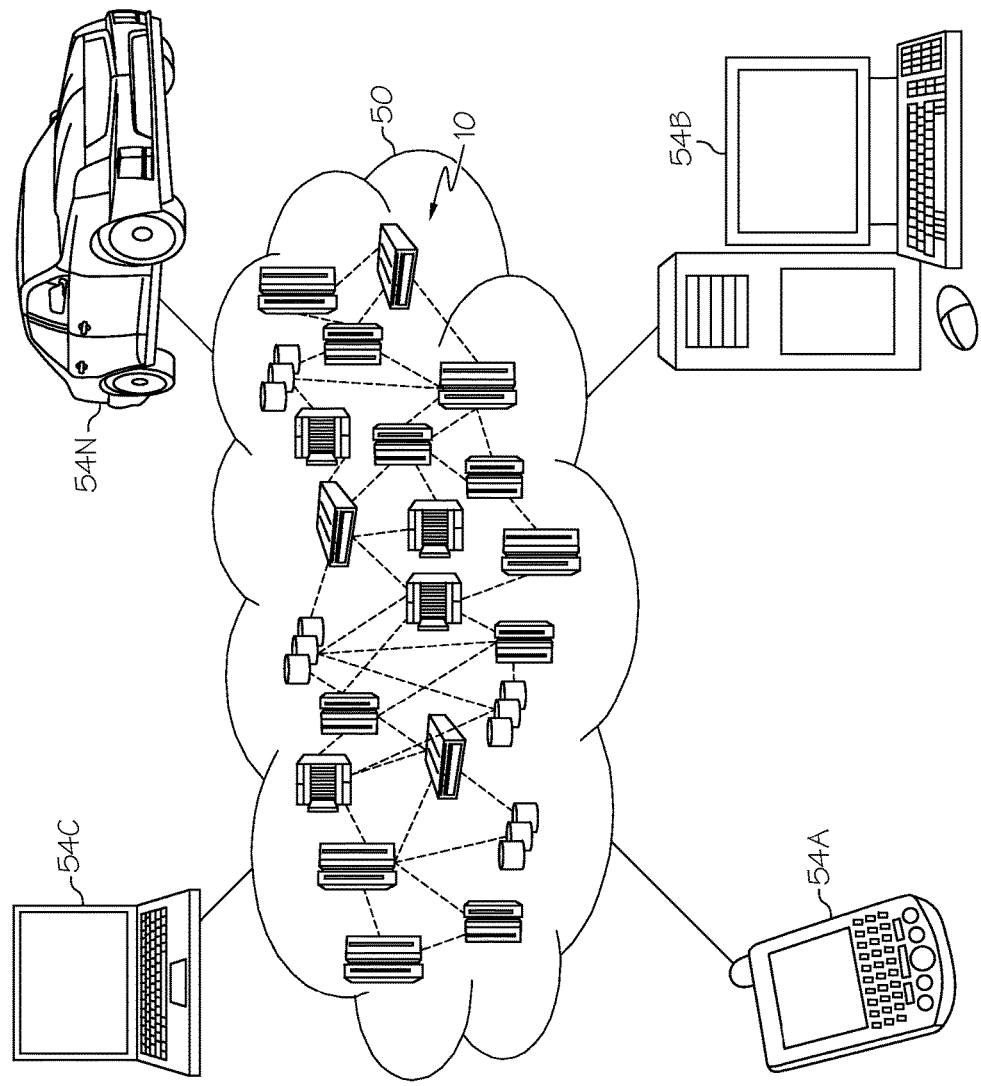
FIG. 10 depicts a cloud computing environment according to an embodiment of the present disclosure.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
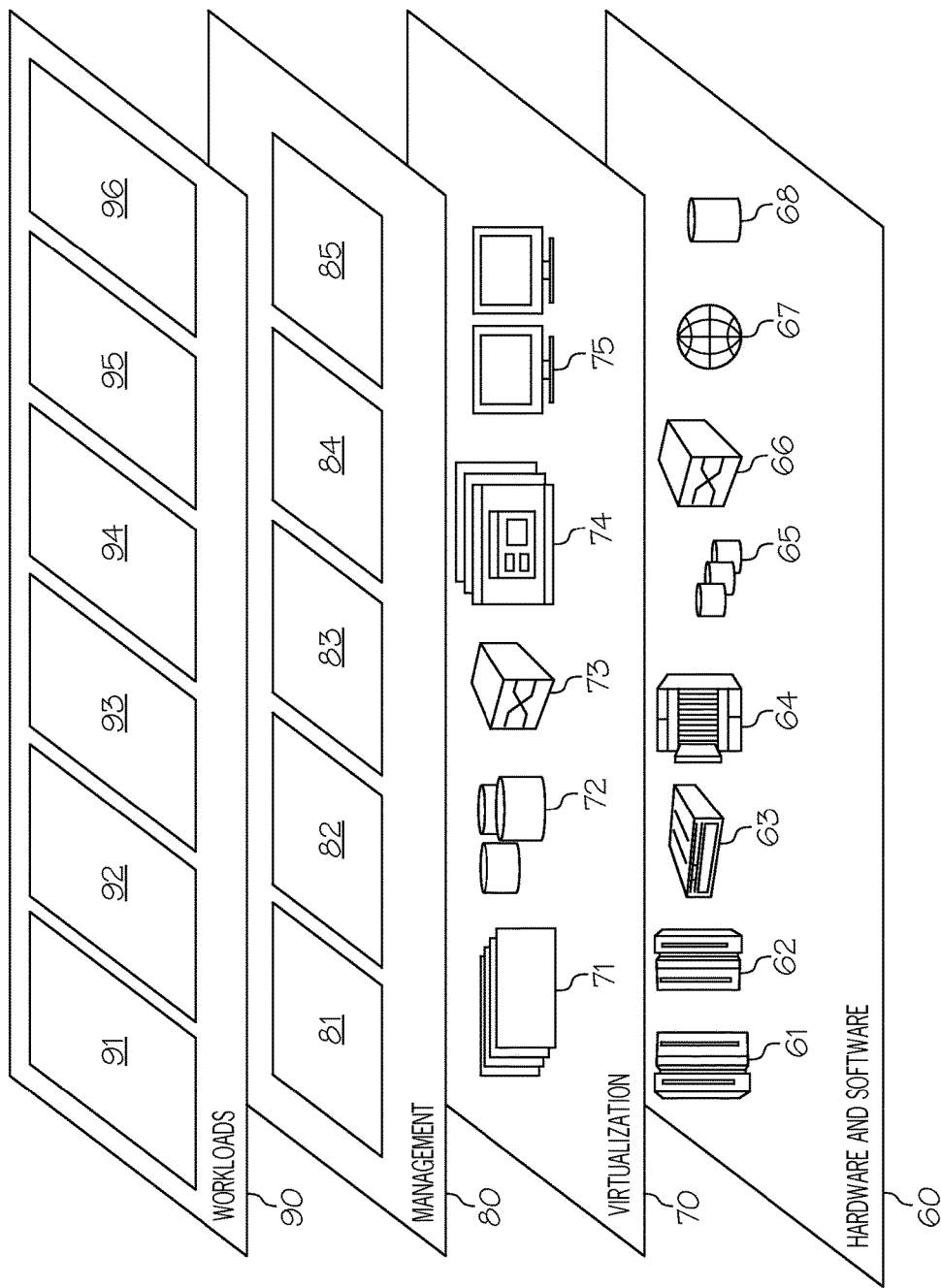
FIG. 11 depicts abstraction model layers according to an embodiment of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resources addresses cache processing 96 (for selectively clearing a resources addresses cache of addresses of resources used by a virtual processor as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer program product to selectively clear a resources addresses cache of addresses of resources used by a virtual processor, the computer program product comprising a non-transitory computer readable storage medium having program code embodied therewith, the program code readable and executable by a processor to perform a method comprising:

dispatching a first virtual processor by a first dispatch from a hypervisor;

tracking processes executed by the first virtual processor during a first predetermined time period after the first dispatch;

caching addresses of resources used by the processes executed by the first virtual processor during the first predetermined time period in a resources addresses cache;

undispatching the first virtual processor by the hypervisor;

dispatching a second virtual processor by a second dispatch from the hypervisor, wherein the second virtual processor utilizes the resources addresses cache;

tracking processes executed by the second virtual processor during a second predetermined time period after the second dispatch;

comparing processes executed by the first virtual processor during the first predetermined time period to processes executed by the second virtual processor during the second predetermined time period;

identifying a level of process utilization consistency based on said comparing of processes; and adjusting said resources addresses cache by selectively clearing resource addresses from the resources addresses cache based on said level of process utilization consistency.

2. The computer program product of claim 1, wherein the method further comprises:

in response to identifying a level of process utilization consistency that falls below a predefined level, erasing all entries from the resources addresses cache.

3. The computer program product of claim 1, wherein the method further comprises:

in response to identifying a level of process utilization consistency that exceeds a predefined level, retaining all entries in the resources addresses cache for prefetch usage by the second virtual processor after the second dispatch.

4. The computer program product of claim 1, wherein the method further comprises:

in response to identifying a level of process utilization consistency that exceeds a predefined level, retaining all entries in the resources addresses cache for prefetch usage by a third virtual processor after a third dispatch of the third virtual processor by the hypervisor.

5. The computer-implemented method of claim 1, wherein the first virtual processor executes within a core of a physical processor, and wherein the resources are components of the core, and wherein the resources addresses cache is a core state addresses cache that stores a soft state of the core at said undispatching of the first virtual processor.

6. A computer system comprising:
a processor, a computer readable memory, and a non-transitory computer readable storage medium;
first program instructions to dispatch a first virtual processor by a first dispatch from a hypervisor;
second program instructions to track processes executed by the first virtual processor during a first predetermined time period after the first dispatch;
third program instructions to cache addresses of resources used by the processes executed by the first virtual processor during the first predetermined time period in a resources addresses cache;
fourth program instructions to undispatch the first virtual processor by the hypervisor;
fifth program instructions to dispatch a second virtual processor by a second dispatch from the hypervisor, wherein the second virtual processor utilizes the resources addresses cache;
sixth program instructions to track processes executed by the second virtual processor during a second predetermined time period after the second dispatch;
seventh program instructions to compare processes executed by the first virtual processor during the first predetermined time period to processes executed by the second virtual processor during the second predetermined time period;
eighth program instructions to identify a level of process utilization consistency based on said comparing of processes; and
ninth program instructions to adjust said resources addresses cache by selectively clearing resource addresses from the resources addresses cache based on said level of process utilization consistency; and wherein the first, second, third, fourth, fifth, sixth, seventh, eighth, and ninth program instructions are stored on the non-transitory computer readable storage medium for execution by one or more processors via the computer readable memory.

7. The computer system of claim 6, further comprising:
tenth program instructions to, in response to identifying a level of process utilization consistency that falls below a predefined level, erase all entries from the resources addresses cache; and wherein the tenth program instructions are stored on the non-transitory computer readable storage medium for execution by one or more processors via the computer readable memory.

8. The computer system of claim 6, further comprising:
tenth program instructions to, in response to identifying a level of process utilization consistency that exceeds a predefined level, retain all entries in the resources addresses cache for prefetch usage by the second virtual processor after the second dispatch; and wherein the tenth program instructions are stored on the non-transitory computer readable storage medium for execution by one or more processors via the computer readable memory.

9. The computer system of claim 6, further comprising:
tenth program instructions to, in response to identifying a level of process utilization consistency that exceeds a predefined level, retain all entries in the resources addresses cache for prefetch usage by a third virtual processor after a third dispatch of the third virtual processor by the hypervisor; and wherein the tenth program instructions are stored on the non-transitory computer readable storage medium for execution by one or more processors via the computer readable memory.

10. The computer system of claim 6, wherein the first virtual processor executes within a core of a physical processor, and wherein the resources are components of the core, and wherein the resources addresses cache is a core state addresses cache that stores a soft state of the core at said undispatching of the first virtual processor.

* * * * *